(12) United States Patent
Jegu et al.

(10) Patent No.: US 8,918,264 B2
(45) Date of Patent: Dec. 23, 2014

(54) METHOD AND DEVICE FOR MONITORING A TURBINE ENGINE OF AN AIRCRAFT

(75) Inventors: Patrick Jegu, Toulouse (FR); Manfred Birnfeld, Blagnac (FR)

(73) Assignee: Airbus Operations (SAS), Toulouse Cedex (FR)

( * ) Notice: Subject to any disclaimer, the term of this patent is extended or adjusted under 35 U.S.C. 154(b) by 257 days.

(21) Appl. No.: 13/488,574

(22) Filed: Jun. 5, 2012

(65) Prior Publication Data

US 2012/0316748 A1 Dec. 13, 2012

(30) Foreign Application Priority Data

Jun. 9, 2011 (FR) .................................. 11 55049

(51) Int. Cl.
*G06F 19/00* (2011.01)
*F01D 21/00* (2006.01)
*F02C 7/262* (2006.01)
*F02C 9/00* (2006.01)

(52) U.S. Cl.
CPC .............. *F01D 21/003* (2013.01); *F02C 7/262* (2013.01); *F02C 9/00* (2013.01); *F05D 2220/323* (2013.01); *F05D 2260/80* (2013.01); *F05D 2270/092* (2013.01); *F05D 2270/303* (2013.01); *Y02T 50/671* (2013.01)
USPC ........................................................ 701/100

(58) Field of Classification Search
CPC ........ G06F 19/00; G01D 3/08; G01D 18/004; G07C 3/00
USPC ........................... 701/3, 14, 31, 35, 100, 31.1
See application file for complete search history.

(56) References Cited

U.S. PATENT DOCUMENTS

2009/0164057 A1* 6/2009 Lecerf ............................. 701/14
2009/0261989 A1* 10/2009 Eick .............................. 340/963

FOREIGN PATENT DOCUMENTS

| EP | 2072399 | 6/2009 |
| EP | 2110516 | 10/2009 |
| EP | 2253804 | 11/2010 |

OTHER PUBLICATIONS

French Patent Office, Preliminary Search Report for FR 1155049, Jan. 23, 2012 (2 pgs.).

* cited by examiner

*Primary Examiner* — Kim T Nguyen
(74) *Attorney, Agent, or Firm* — Wood, Herron & Evans, LLP

(57) ABSTRACT

A method and device aids in monitoring at least one turbine engine in an aircraft. The method includes determining a value illustrating a thermomechanical state of the turbine engine, and comparing the determined value with at least one threshold. The method also includes displaying in the cockpit of the aircraft, at least one indication related to the operation of the turbine engine, according to this comparison. As a result, conditions that could result in mechanical degradation or failure of the turbine engine are identified for a crew of the aircraft.

14 Claims, 2 Drawing Sheets

METHOD AND DEVICE FOR MONITORING A TURBINE ENGINE OF AN AIRCRAFT

TECHNICAL FIELD

The present invention relates to an aiding method and device for monitoring a turbine engine of an aircraft, in particular a transport plane.

The invention relates to detection and procedure processing of the differential heat expansion conditions that can result in a rotor lock or other mechanical degradations on engines of the aircraft turbine engine type, as well as to the improvement in procedures for shutting down and relighting such turbine engines.

BACKGROUND

It is known that, under some operating conditions, the stoppage of a turbine engine such as a turbojet or a turbopropeller can result in a turbine mechanical lock, due to a differential expansion between stator and rotor elements. This phenomenon is known as "core lock" or "rotor lock". This lock makes it impossible to re-start the engine: upon a flight, in the case of an abrupt shutdown, but also on the ground, in the case of too an early shutdown after landing or for fuel saving purposes, running is sometimes performed with a reduced number of engines.

Beyond the "core-lock" effect, the present invention is also of interest as regards protection against thermomechanical fatigue effects. When subjected to intensive and frequent thermal cycles, metal parts of the engine components actually undergo thermomechanical type stresses which may lead to cracks in the metal structure of the engine components. Cracks initiated within the compressor or turbine disks for example can propagate and result in the breaking thereof. The high speeds of rotation of these elements, as well as their big size, can result upon breaking thereof in significant damage to the propulsive system, to the aircraft or to the environment, because the energy level being induced is then very high.

The engine shutdown phases represent significant exposures to the thermomechanical fatigue phenomenon, if engine shutdown precautions, consisting in waiting several minutes with an engine maintained at an idle speed before shutting down, are not applied.

In the case of the engine being stopped by an abrupt shutdown, for example caused by an aerodynamic distortion, a temporary fuel deprivation or on a crew command, the air used for cooling mechanic parts of the turbine does not flow any longer sufficiently within the engine. If the aircraft travel speed is low, the "windmilling" engine driving (engine rotation under the effect of the air speed penetrating it, by a "windmill" effect) engine driving is too low or absent. Then, the differential expansion and contraction between the turbine rotor, stator and casing are such that these parts can come into mechanical contact and can make it impossible to re-start the windmilling engine, or even with the assistance of the starter. The differential heat expansion and contraction can have effects in the radial/longitudinal direction. If there is no contact and no rotation possible, re-starting an engine which has been shut down without waiting for a sufficiently long period at idle can result in vibrations or frictions at the end of the rotating parts, generated for example by a so-called "rotor bow" phenomenon where the shaft bearing the compressor stages and the turbine as well as the fixed structure consisting of the stators and the casing are bowed between the two ends thereof. Starting under an excessive "rotor bow" and a contact with the compressor vanes can initiate cracks in the latter.

SUMMARY OF THE INVENTION

The object of the present invention is to overcome the above mentioned drawbacks. It relates to a method which can provide an aircraft crew with some aid to monitor at least one turbine engine of said aircraft, by allowing in particular detection and indication of conditions during which the stoppage of a turbojet or turbopropeller can lead to thermomechanical lock thereof, preventing its restarting, or to a lesser extent, difficulties and possible damage upon starting, if this restarting is carried out in a particular time window after a shutdown.

To that end, according to the invention, said method is remarkable in that the following successive operations are automatically and repeatedly performed, consisting in:

a) measuring at least one parameter (preferably a temperature) relating to the turbine engine on the aircraft;

b) determining, thru the thus measured parameter, a value illustrating a thermomechanical condition of the turbine engine;

c) comparing the thus determined value of the thermomechanical condition with at least one threshold value; and d) providing at least displaying means capable of showing on a viewing screen of the aircraft cockpit, depending on the comparison implemented at step c), at least one indication relating to the operation of the turbine engine which comprises at least one of the following indications:

an indication relating to a damage risk for the turbine engine;
  an indication relating to a lock risk for the turbine engine; and
  an indication relating to an operational procedure.

Thus, thanks to the invention, it is possible to determine and display, on a viewing screen of the aircraft cockpit, information relating to the turbine engine operation, and more precisely, as set out hereinunder, information relating to a damage risk for the turbine engine (in the case of a turbine engine shutdown or in the case of a turbine engine re-start, depending on the current situation) and/or information relating to an operational procedure, such that the pilot is informed about the actions to be implemented.

Consequently, by observing the information being displayed, a crew member is able to quickly interpret the turbine engine condition, which enables him/her to take suitable decisions. Furthermore, since the indications are repeatedly updated, he/she has access to information illustrating the current situation.

In a first preferred embodiment, as a parameter, at least one temperature (and in particular one turbine gas discharge temperature) is measured, which is then used at step b) to determine, thru a calculation method, a value illustrating the turbine engine thermomechanical condition. Advantageously, said calculation method is determined at a preliminary step, in particular using calculations, tests and/or simulations. As a turbine gas discharge temperature, an EGT ("Exhaust Gas Temperature") temperature or a TGT ("Turbine Gas Temperature") temperature can be taken into account.

Within the scope of the present invention, the turbine engine thermomechanical condition illustrates the expansion of at least one element of the latter (or the differential expansion between several elements) depending on the thermal conditions existing within the turbine engine, wherein such an expansion can result in undesired contacts or frictions and possibly a mechanical lock.

Further, in a particular embodiment, the current turbine engine speed is monitored, and steps b) to d) are implemented as soon as the current speed is higher than the idle speed.

Besides, advantageously, at step c), said value of the thermomechanical condition can be compared with a plurality of different threshold values, and the indications displayed depend on the result of all these comparisons.

The present invention is applicable both to an aircraft which is on the ground (for example upon running on an airport or during an engine test under maintenance) and to an aircraft in flight. Its object is to provide cockpit indications to the crew. Depending on the aircraft operational phase (on the ground or in flight), different indications are proposed, as set out hereinunder.

In a first embodiment, for an aircraft which is in a ground phase with an operating turbine engine, at step d), an indication is advantageously showed, which indicates the risk involved in the case of a turbine engine shutdown (depending on the thermo-mechanical condition being calculated). In this case, if a shutdown (whether wanted or not) of the turbine engine occurs, an indication is showed, which provides information relating to a possible turbine engine re-start. In particular, this indication can advantageously comprise a minimum waiting period being recommended before a re-start.

Thus, for an application on the ground, it is contemplated to implement an indicator within the cockpit allowing the crew to be informed about the risk involved in the case of a turbine engine shutdown. This indicator is displayed on the ground and enables the aircraft engine shutdown to be managed on conditions enabling mechanical stresses to be avoided. In particular, during the running phase, shutting down the engines just after the flight end requires precautions in terms of procedure, since the engine thermomechanical condition is still high at this time.

In this application, the present invention enables a pilot to optimize the use of the engines on the ground in the running phase by shutting down one or several turbine engines without causing any damage. This results in:
- an optimization of the fuel consumption in such phase and thus cost savings; and
- a decrease in the thermomechanical stresses on the constituent elements of the turbine engine, which causes an extended life time of the turbine or compressor disks and enables to take advantage of the associated economical advantage.

Furthermore, in a second embodiment, for an aircraft being in a flight phase, for which a shutdown (whether wanted or not) of the turbine engine being monitored has just occurred, at step d), an indication is advantageously showed, which provides information relating to a possible re-start of this turbine engine. Preferably, said indication comprises an optimum aircraft speed for the turbine engine windmilling being re-started.

Thus, for an application to a flight phase, it is contemplated to implement an indicator within the cockpit enabling, in the case of a wanted or unwanted shutdown of the turbine engine, the operational piloting procedure to be indicated for a re-start under optimum conditions.

The present invention also relates to an automatic aiding device for monitoring at least one turbine engine of an aircraft, comprising at least one turbine.

According to the invention, said device is remarkable in that it includes:
first means for measuring on the aircraft at least one parameter (and in particular the temperature) relating to the turbine engine;
second means for determining, thru the thus measured parameter, a value illustrating a thermomechanical condition of the turbine engine;
third means for comparing the value of the thus determined thermomechanical condition with at least one threshold value; and
displaying means capable of showing on a viewing screen of the aircraft cockpit, depending on the comparison implemented by said third means, an indication relating to the operation of the turbine engine which comprises at least one of the following indications:
an indication relating to a damage risk for the turbine engine;
an indication relating to a lock risk for the turbine engine; and
an indication relating to an operational procedure.

Within the scope of the present invention, said second and third means can be part of:
a turbine engine control calculator, for example a full authority electronic digital control system of the FADEC ("Full-Authority Digital Engine Control") type; or
a calculator of the aircraft, which receives engine parameters via aboard avionic communications.

The present invention also relates to:
an aircraft system for an aircraft provided with a plurality of turbine engines, which comprises a plurality of monitoring devices such as the one set out; and
an aircraft, in particular a transport plane, which is provided with such a system and/or such a device.

BRIEF DESCRIPTION OF THE DRAWINGS

The figures of the appended drawings will help to understand how the invention can be carried out. In these figures, identical references designate similar elements.

DETAILED DESCRIPTION

Figure 1:
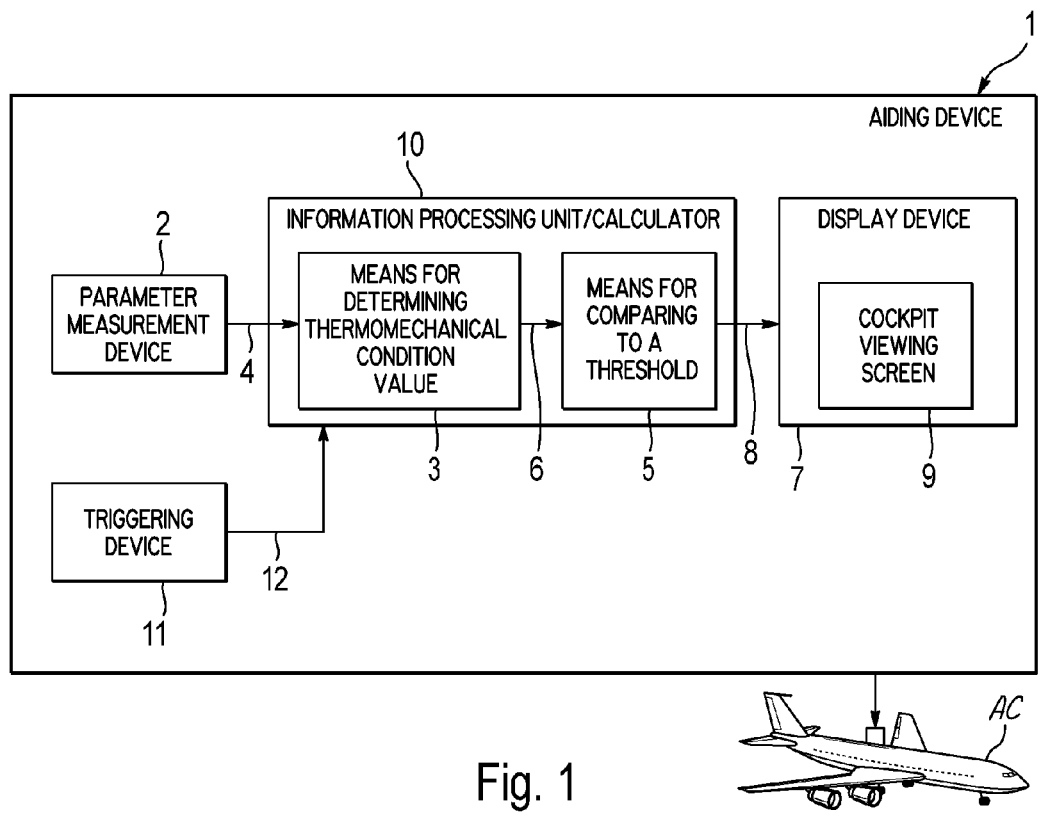
FIG. 1 is a block diagram of an aiding device for monitoring in accordance with the invention.

The aiding device 1 in accordance with the invention and schematically represented in FIG. 1 is intended to aid the crew of an aircraft (AC), in particular of a civil transport plane, to monitor at least one turbine engine such as a turbojet or a turbopropeller of said aircraft which makes part of a propulsive system of the latter.

To the end, said aiding device 1 which is automatic and onboard the aircraft includes, according to the invention:
a parameter measurement device 2 for measuring, in a usual manner, on the aircraft, at least the current value of a parameter relating to the turbine engine, set out below;
means 3 which are connected thru a link 4 to said parameter measurement device 2 and which are formed so as to determine, using at least the thus measured current value, a value illustrating a thermomechanical condition of the turbine engine;
means 5 which are connected thru a link 6 to said means 3 and which are formed so as to compare the determined value of the thermomechanical condition (from the means 3) to at least one predetermined threshold value, for example the value S3 of FIG. 3; and a display device 7 which are connected thru a link 8 to said means 5 and which are formed so as to show, on at least one cockpit viewing screen 9 (or part of the screen) of the cockpit of the aircraft, depending on a comparison implemented by means 5, an indication relating to the operation of the turbine engine.

According to the invention, this indication relating to the operation of the turbine engine comprises, as set out hereinafter, at least one of the following indications:
- an indication relating to a damage risk for the turbine engine;
- an indication relating to a lock risk for the turbine engine; and
- an indication relating to an operational procedure.

Such indications can be showed on the viewing screen 9 as text and/or symbols of different colours and/or different types.

Preferably, said parameter measurement device 2 measure, as a parameter, at least one temperature, and in particular a turbine gas discharge temperature, such as the EGT ("Exhaust Gas Temperature") or the TGT ("Turbine Gas Temperature"). They can however measure any type of parameter for determining the thermomechanical condition of the turbine engine.

Figure 2:
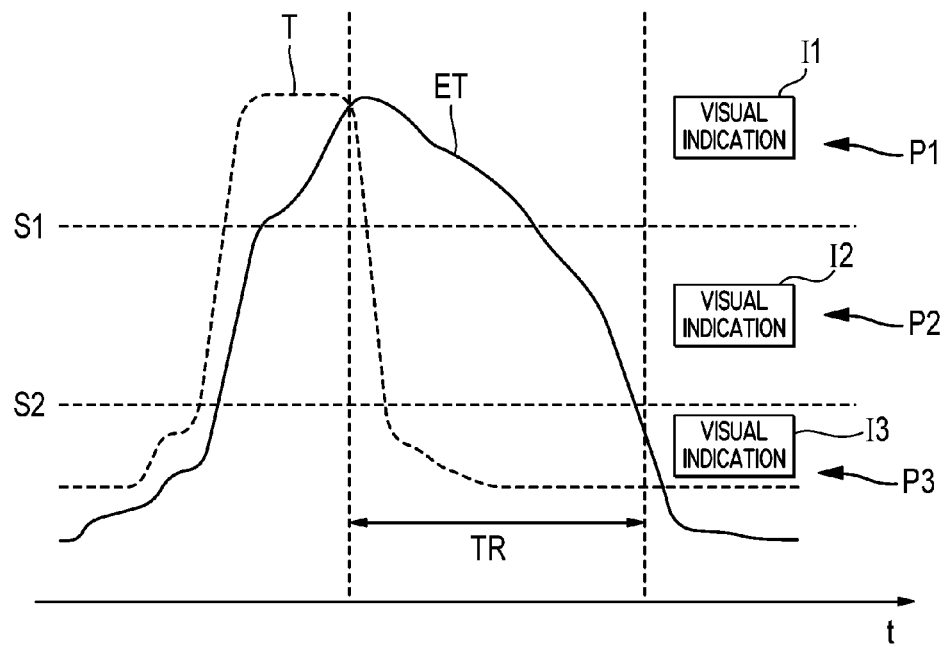
FIG. 2 is a graph enabling characteristics of the present invention to be explained, specifically for the ground phase.

Furthermore, in a particular embodiment, the means 5 compare the current value of the thermo-mechanical condition with a plurality of different threshold values S2 and S3, as represented for example in FIG. 2, and the indications displayed on the cockpit viewing screen 9 depend on the position of this current value with respect to these threshold values S2 and S3.

Thus, the aiding device 1 in accordance with the invention is able to determine and display on a viewing screen 9 of the aircraft cockpit information relating to the turbine engine operation, and more precisely, as indicated below, information relating to a damage risk for the turbine engine (in case of a turbine engine being shutdown or in case of a turbine engine re-started, depending on the current situation) and/or information relating to an operational procedure, for aiding the pilot.

Consequently, by observing the information displayed on the screen 9, a crew member is able to quickly interpret the turbine engine condition, which enables him/her to take suitable decisions. Furthermore, since the indications are repeatedly updated, he/she has access to information illustrating the current situation.

The present invention is applicable both to an aircraft which is on the ground (for example upon running on an airport or during an engine test in maintenance) and an aircraft in flight. Of course, depending on the airplane operational phase (on the ground or in flight), different indications are displayed.

The means 3 thus determine a value illustrating the thermomechanical condition ET of the turbine engine. Within the scope of the present invention, the thermomechanical condition ET of a turbine engine illustrates the expansion of at least one element of the latter depending on thermal conditions within the turbine engine, and more particularly the differential expansion between several elements that can result in undesired contacts and possibly a lock. The elements being taken into account are all those that can cause the previous phenomena, and more particularly the turbine, but also the compressor or other components.

To this end, said means 3 thus use the measured values of the parameter(s) used and implement a calculation method, via tables and/or calculations. This calculation method is predetermined, in particular using calculations, tests and/or simulations.

In particular, to define such calculation method, an experiment on a test bench can be carried out, which enables the thermomechanical response of the turbine to be characterised, depending on different tested speeds and in particular depending on the gas discharge temperature. During this testing, it is possible to perform a measurement of expansions at the end of the turbine blade, or even to measure the variation in the axial clearances between the stators and rotors of the turbines or compressors.

The calculation method can be based for example on data tables from measurements on a test bench, or can be characterised by the following elements:
- a rise time in a thermomechanical condition;
- a fall time from a high thermomechanical condition to a thermal condition being sufficiently low to provide sufficient clearances and avoid a lock thru a differential expansion upon an engine shutdown.

The calculation method can also use calculation techniques, such as filtering means as a function of the EGT temperature for example.

Figure 3:
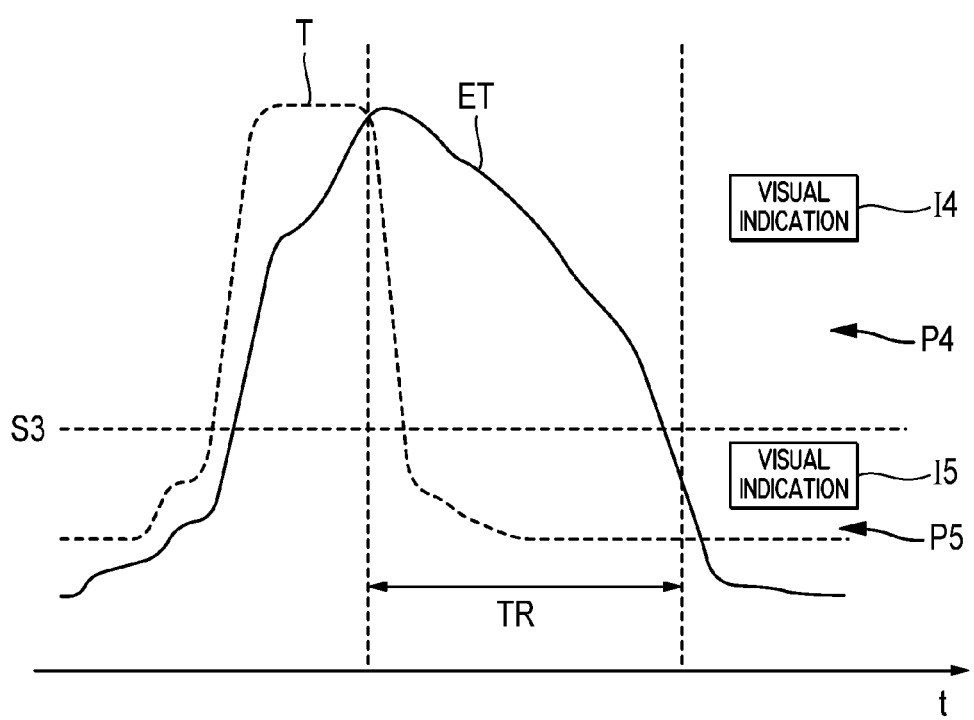
FIG. 3 is a graph enabling characteristics of the present invention to be explained, specifically for the flight phase.

The evolution in the thermomechanical condition ET of the turbine as a function of temperature T, herein the EGT temperature, during time t is illustrated in FIGS. 2 and 3. The thermo-mechanical condition ET to prevent differential locks is satisfactorily reduced when the turbine engine is maintained at an idle speed for a duration TR sufficiently long before the turbine engine is shut down, as set out below.

In a preferred embodiment, said means 3 and 5 are part of an information processing unit/calculator 10 which can be integrated:
- either into a turbine engine control calculator, for example a FADEC ("Full-Authority Digital Engine Control") type full-authority digital electronic control system; or
- into a calculator of the aircraft, which receives engine parameters via aboard aircraft avionic communications.

Besides, in a particular embodiment, said aiding device 1 further includes a triggering device(s) 11 which are for example connected by a link 12 to the processing unit 10. These triggering device(s) 11 monitor the current speed of the turbine engine, and trigger the monitoring implemented by the aiding device 1 (and in particular the calculation of the thermomechanical condition parameter ET) as soon as the current speed is above the idle speed.

A first embodiment of the invention is applied to an aircraft which is in a ground phase. In this case, when the turbine engine monitored is operating, the aiding device 1 shows on the screen 9 an indication indicating the risk involved in a case of a turbine engine shutdown (depending on the current thermomechanical condition calculated). Moreover, in this case, if a shutdown (whether wanted or not) of the turbine engine occurs, the aiding device 1 shows on the screen 9 an indication providing information relating to a possible turbine engine re-start. In particular, this indication can comprise a minimum waiting period being recommended before a re-start. Preferably, the screen 9 is a conventional screen which displays primary control parameters of the aircraft engines.

Thus, for an application on the ground, an indicator is provided within the cockpit which allows to indicate to the crew the risk involved in the case of an engine shutdown. This indication enables the shutdown of engines of the aircraft to be managed under conditions enabling the above mentioned mechanical stresses to be avoided. In particular, during the running phase, the shutdown of engines just after the end of the flight requires precautions in terms of procedure, since the engine thermomechanical condition is still high at this time.

This indicator can have any number of conditions, depending on the accuracy of the processings implemented.

In the embodiment being described hereinafter in reference to FIG. 2, the means 5 compare the current value ETc (determined by the means 3) of the thermomechanical condition ET to two different threshold values S1 and S2, and the indications being displayed depend on the result of all these comparisons. In this case, the turbine engine can have one of the three following thermo-mechanical conditions P1, P2 and P3:

high (P1), when the current value ETc is higher than or equal to the biggest threshold value S1;
intermediate (P2), when the current value ETc is between the two threshold values S1 and S2; and
low (P3) when the current value ETc is lower than or equal to the lowest threshold value S2.

When the means 5 infer that the thermo-mechanical condition of the turbine is high, the indication I1 being showed on the viewing screen 9 indicates (as a text, in particular as an abstract and/or as symbols) that the turbine engine shutdown being monitored is to be avoided if possible. Such a shutdown actually exposes to a risk of turbine mechanical lock. It is then forbidden by an operational procedure to shut down the turbine engine, except for an emergency case, because significant damages can be caused. It will be noticed that the aircraft manual refers to this indication and gives the possible risks in the case of a shutdown.

In this case, the indication I1 is displayed, preferably in a red colour or another colour signalling a potential danger, to clearly mean that the engine shutdown exposes to a risk of a mechanical lock for the propulsive system.

In the case of a shutdown on the ground performed in a high thermomechanical condition (critical for the engine integrity), it is proposed to display on the viewing screen 9 a suitable message for example of the type:

"HOT ENG SHUTDOWN, RE-START ENG AND OPERATE AT IDLE", i.e. hot engine shutdown, re-start engine and operate at idle.

Further, the means 5 can infer that the turbine engine is in an intermediate thermomechanical condition, for which the shutdown can cause difficulties during a subsequent re-start.

When the thermomechanical condition is intermediate, an indication I2 being showed on the viewing screen 9 (as a text, in particular as an abstract and/or as symbol) enables the crew's attention to be drawn to the fact that the engine shutdown is at risk. The engine is still hot and the shutdown is to be avoided if possible. The engine stoppage under these conditions can result in damages during a subsequent re-start, due to high vibrations because of differential heat expansions and/or contacts at the end of turbine vanes. The aircraft manual indicates the time at the end of which it is possible to re-start the engine without being put at such risks.

When the turbine thermomechanical condition is intermediate, the indicator I2 is displayed, preferably in an amber colour.

In the case of a shutdown on the ground being performed in an intermediate thermomechanical condition, a suitable message can possibly complete the condition indicator and indicate the period of time before performing a subsequent re-start, for example of the type:

"HOT ENG SHUTDOWN, NO RE-START BEFORE X MIN" (hot engine shutdown, no re-start before X minutes).

The period of time (X minutes) will be determined by the engine tests. The message will include such information and the aircraft manual will indicate the time (X minutes) at the end of which it is possible to re-start the engine without being put at these risks, or which operational instruction should be followed to avoid damages.

Further, the means 5 can infer that the turbine thermomechanical condition is low and enables the engine to be shut down without a risk of mechanical lock or deterioration due to a thermo-mechanical condition. The corresponding indicator I3 is showed on the viewing screen 9, preferably in a green colour. The crew can then conduct the engine shutdown with no fear of heat damages.

Consequently, on the ground, a visual indication I1, I2, I3 of the thermomechanical condition is provided to the crew in order to optimize the engine shutdown procedure, aiming at avoiding to be put at a risk of a so-called "core lock" phenomenon, or to thermal origin mechanical fatigue stresses. This indicator can also be completed by text messages indicating the procedure to be followed to conduct the engine re-start.

In this application, the present invention enables a pilot to optimize the use of the turbine engine on the ground in a running phase by shutting down one or several turbine engines without causing damages. This results in:

an optimization of the fuel consumption in this phase and thus cost savings; and
a decrease in the thermomechanical stresses on the constituent elements of the turbine engine, which causes an extended lifetime of the turbine or compressor disks, thereby benefiting from the associated economical advantage.

Furthermore, a second embodiment of the invention is applied to an aircraft which is in a flight phase. In this case, if a shutdown (whether wanted or not) of the turbine engine occurs, the device 1 displays on the viewing screen 9 an indication I4, I5 which gives information about the operational piloting procedure to be followed in order to enable the engine to be re-started in optimum conditions. If necessary, such an indication can also indicate an optimum aircraft speed for the turbine engine in windmilling re-start.

In the embodiment described hereinafter (by way of example) in reference to FIG. 3, the means 5 compare the current value ETc (determined by means 3) of the thermomechanical condition ET to a single threshold value S3, and indications I4 and I5 displayed on the viewing screen 9 depend on the result of this comparison. In this case, the turbine engine can have one of the two following thermomechanical conditions P4 and P5:

critical (P4), when the current value ETc is higher than or equal to the threshold value S3; and
low (P5) when the current value ETc is lower than said threshold value S3 so as to allow an immediate engine re-start.

In flight, in the case of a shutdown performed in a critical thermomechanical condition for the integrity of the engine, it is proposed to display a suitable message on the viewing screen 9 for example of the type: HOT ENG SHUTDOWN, MANDATORY MAINTAIN SPEED FOR RELIGHT: Y kt" (i.e. hot engine shutdown, mandatory maintaining speed for relight: Y knots).

The indicated speed (Y kt) represents the optimum speed for the engine windmilling re-start. Forcing this speed to be reached, by rotating the engine, enables on the one hand the time between the shutdown and the attempt to re-start under favourable conditions for it after a shutdown in cruising altitude to be restricted, and on the other hand, a sufficient air flow to be established within the engine. This air flow enables the rotors to be maintained in rotation and the hot and thus expanded parts of the engine to be cooled, by decreasing the volume of these parts, thereby enabling increase of the probability of re-starting by removing the mechanical seizing risk due to the differential expansion and contraction of mechanical parts.

Consequently, by enabling conditions imposing high thermomechanical stresses to be avoided, the aiding device 1 generates an increase in the lifetime of the mechanical components of the engine and has an economical and operational advantage for operators. More particularly:

On the ground, the application of procedures associated with the invention enables the contact phenomena at the end of turbine blade or the vibratory unbalancing mass phenomena which occur when the engine has been switched off in too a hot condition to be prevented, by postponing the subsequent re-start. The aiding device 1 further enables, when associated with adapted operational procedures, the shutdown procedure to be optimized in order to carry out the running on a reduced number of engines, this procedure being searched for by operators for fuel saving purposes.

In flight, the aiding device 1 can be used in order to warn the crew about the operational procedure which will enable to conduct the engine re-start in the best conditions, avoiding the case of a "core lock" type thermomechanical lock.

Of course, the present invention is formed so as to monitor, preferably, all the aircraft turbine engines. To this end, either the monitoring aiding device 1 is formed so as to implement the preceding procedures for all the turbine engines, in which case the displaying device 7 can then include a single screen to display all the indications or one screen per turbine engine, or a system is provided which includes a plurality of monitoring aiding devices 1 each being dedicated to one turbine engine.

The invention claimed is:

1. An aiding method for monitoring at least one turbine engine of an aircraft, the method comprising the following operations, carried out automatically and repeatedly:
    (a) measuring, by a parameter measurement device, at least one temperature relating to the turbine engine;
    (b) determining, by an information processing unit/calculator, a value illustrating a thermomechanical condition of the turbine engine, the value illustrating the thermomechanical condition being determined by a calculation method and being dependent on thermal conditions identified by the at least one temperature that has been measured, wherein the value illustrating the thermomechanical condition identifies differential expansion between elements of the turbine engine that can lead to undesired frictional contact and damage of the elements and that can also lead to rotor lock;
    (c) comparing, by the information processing unit/calculator, the determined value illustrating the thermomechanical condition with at least one predetermined threshold value; and
    (d) showing, by a display device, at least one indication on a cockpit viewing screen of the aircraft, depending on the comparison of step (c), the at least one indication relating to operation of the turbine engine and including at least one of the following indications:
        an indication relating to a damage risk for the turbine engine;
        an indication relating to a lock risk for the turbine engine; and
        an indication relating to an operational procedure.

2. The method according to claim 1, wherein at step (b), the value illustrating the thermomechanical condition of the turbine engine is determined by a predetermined calculation method provided to the information processing unit/calculator.

3. The method according to claim 2, further comprising a preliminary step of:
    defining the predetermined calculation method by performing a bench test experiment enabling to characterize a thermomechanical response of the turbine engine depending on different speeds being tested.

4. The method according to claim 1, further comprising:
    monitoring a current speed of the turbine engine, wherein steps (b) through (d) are implemented when the current speed is higher than a predetermined idle speed.

5. The method according to claim 1, wherein at step (c), the determined value illustrating the thermomechanical condition is compared with a plurality of different predetermined threshold values.

6. The method according to claim 1, wherein when the aircraft is in a ground phase, with the turbine engine in operation, one indication is shown, at step (d) that indicates a pending risk upon a shutdown of the turbine engine.

7. The method according to claim 6, wherein when the shutdown of the turbine engine has just occurred,
    one indication is shown at step (d) providing information relating to a possible restarting of the turbine engine and at least a minimum waiting duration being recommended before a restarting of the turbine engine.

8. The method according to claim 1, wherein when the aircraft is in a flight phase, and when a turbine engine shutdown has just occurred,
    an indication is presented, at step (d) which provides information relating to a possible restarting of the turbine engine.

9. The method according to claim 8, wherein the indication comprises an optimum speed of the aircraft to restart the turbine engine in windmill.

10. An aiding method for monitoring at least one turbine engine of an aircraft, the method comprising the following operations, carried out automatically and repeatedly:
    (a) measuring, by a parameter measurement device, at least one temperature relating to the turbine engine;
    (b) determining, by an information processing unit/calculator, a value illustrating a thermomechanical condition of the turbine engine by illustrating expansion of at least one element of the turbine engine, depending on thermal conditions identified by the at least one temperature that has been measured;
    (c) comparing, by the information processing unit/calculator, the determined value illustrating the thermomechanical condition with at least one predetermined threshold value; and
    (d) showing, by a display device, at least one indication on a cockpit viewing screen of the aircraft, depending on the comparison of step (c), the at least one indication relating to operation of the turbine engine and including at least one of the following indications:
        an indication relating to a damage risk for the turbine engine;
        an indication relating to a lock risk for the turbine engine; and
        an indication relating to an operational procedure,
    wherein when the aircraft is in a ground phase, with the turbine engine in operation, one indication is shown, at step (d) that indicates a pending risk upon a shutdown of the turbine engine,
    wherein when the shutdown of the turbine engine has just occurred, one indication is shown at step (d) providing information relating to a possible restarting of the turbine engine and at least a minimum waiting duration being recommended before a restarting of the turbine engine, and wherein at step (c), the determined value illustrating the thermomechanical condition is compared with two threshold values S1 and S2, the threshold value S1 being larger than the threshold value S2, and the method further comprises:

when the determined value is higher than or equal the threshold value S1, the turbine engine presents the thermomechanical condition, for which the shutdown of the turbine engine is to be avoided;

when the determined value is between the threshold values Si and S2, the turbine engine presents the thermomechanical condition, for which the shutdown can cause difficulties upon a subsequent restarting; and when the determined value is lower than or equal to the threshold value S2, the turbine engine presents the thermomechanical condition making the shutdown possible.

11. An aiding device for automatically monitoring at least one turbine engine of an aircraft, the aiding device comprising—:

a parameter measurement device on the aircraft which measures at least one temperature relating to the turbine engine;

an information processing unit/calculator which (i) uses the measured at least one temperature to determine a value illustrating a thermomechanical condition of the turbine engine, the value illustrating the thermomechanical condition being determined by a calculation method and being dependent on thermal conditions identified by the at least one temperature that has been measured, wherein the value illustrating the thermomechanical condition identifies differential expansion between elements of the turbine engine that can lead to undesired frictional contact and damage of the elements and that can also lead to rotor lock, and (ii) compares the value illustrating the thermomechanical condition with at least one predetermined threshold value; and a display device which shows on a cockpit viewing screen, depending on the comparison with at least one predetermined threshold value, at least one indication relating to the operation of the turbine engine and including at least one of the following indications:

an indication relating to a damage risk for the turbine engine;

an indication relating to a lock risk for the turbine engine; and an indication relating to an operational procedure.

12. The device according to claim 11, wherein the information processing unit/calculator is part of a FADEC control calculator for the turbine engine.

13. The device according to claim 11, wherein the information processing unit/calculator is part of an aircraft calculator.

14. An aircraft system for an aircraft, comprising:

plurality of turbine engines, and a plurality of aiding devices, each of which is associated with one of said turbine engines and each of which comprises:

a parameter measurement device on the aircraft which measures at least one temperature relating to the turbine engine;

an information processing unit/calculator which (i) uses the measured at least one temperature to determine a value illustrating a thermomechanical condition of the turbine engine, the value illustrating the thermomechanical condition being determined by a calculation method and being dependent on thermal conditions identified by the at least one temperature that has been measured, wherein the value illustrating the thermomechanical condition identifies differential expansion between elements of the turbine engine that can lead to undesired frictional contact and damage of the elements and that can also lead to rotor lock, and (ii) compares the value illustrating the thermomechanical condition with at least one predetermined threshold value; and a display device which shows on a cockpit viewing screen, depending on the comparison with at least one predetermined threshold value, at least one indication relating to the operation of the turbine engine and including at least one of the following indications:

an indication relating to a damage risk for the turbine engine;

an indication relating to a lock risk for the turbine engine; and an indication relating to an operational procedure.

* * * * *